(12) United States Patent
Bigdeli et al.

(10) Patent No.: US 10,216,786 B2
(45) Date of Patent: Feb. 26, 2019

(54) AUTOMATIC IDENTITY ENROLMENT

(75) Inventors: Abbas Bigdeli, Eveleigh (AU); Brian Lovell, Indooroopilly (AU); Sandra Mau, Eveleigh (AU)

(73) Assignee: IOMNISCIENT PTY LTD., Gordon, NSW (AU)

( * ) Notice: Subject to any disclaimer, the term of this patent is extended or adjusted under 35 U.S.C. 154(b) by 38 days.

(21) Appl. No.: 13/695,255

(22) PCT Filed: May 13, 2011

(86) PCT No.: PCT/AU2011/000558
§ 371 (c)(1),
(2), (4) Date: Dec. 4, 2012

(87) PCT Pub. No.: WO2011/140605
PCT Pub. Date: Nov. 17, 2011

(65) Prior Publication Data
US 2013/0138652 A1    May 30, 2013

(30) Foreign Application Priority Data
May 13, 2010 (AU) ................. 2010902032

(51) Int. Cl.
*G06F 17/30* (2006.01)
*G06K 9/00* (2006.01)
*G07C 9/00* (2006.01)

(52) U.S. Cl.
CPC .. *G06F 17/30386* (2013.01); *G06F 17/30598* (2013.01); *G06K 9/00892* (2013.01);
(Continued)

(58) Field of Classification Search
CPC ........ G06F 7/02; G06F 21/32; G06F 2201/81; G06F 21/00; G06F 21/30; G06F 21/31;
(Continued)

(56) References Cited

U.S. PATENT DOCUMENTS 6,758,394 B2   7/2004   Maskatiya et al.
7,064,652 B2   6/2006   Junqua et al.
(Continued)

FOREIGN PATENT DOCUMENTS

AU   2007223336       9/2007
EP       2234324 B1 * 5/2012 ............. G06F 21/32
(Continued)

OTHER PUBLICATIONS

International Search Report, PCT/AU2011/000558; completion date Jun. 21, 2011; 4 pages.
(Continued)

*Primary Examiner* — Augustine K. Obisesan

(57) ABSTRACT

Biometric computer systems are systems which use one or biometric identifiers to enroll, verify or identify a person. This disclosure concerns the automatic enrolment of people into biometric systems. Aspects include methods, computer systems, software and biometric systems. A first biometric identifier (i.e. face) and a second biometric identifier (e.g. iris) is captured (201). The first biometric identifier (e.g. face) is compared (206) to the biometric identifiers associated with records in the datastore (i.e. employment records 121) to identify a candidate matching record. An association of the second biometric identifier with the candidate record to be stored (209) in memory.

16 Claims, 3 Drawing Sheets

(52) U.S. Cl.
CPC ..... G06K 9/00926 (2013.01); G07C 9/00158 (2013.01); G07C 2209/02 (2013.01)

(58) Field of Classification Search
CPC . G06F 21/33; H04L 63/0861; H04L 63/0227; H04L 9/3247; G06Q 20/40145; G06Q 20/40; G06Q 20/4012
See application file for complete search history.

(56) References Cited

U.S. PATENT DOCUMENTS

| | | | |
|---|---|---|---|
| 7,269,737 B2 | 9/2007 | Robinson | |
| 7,298,873 B2 | 11/2007 | Miller, Jr. et al. | |
| 7,360,239 B2 | 4/2008 | Mandalia et al. | |
| 7,367,049 B1 | 4/2008 | Robinson et al. | |
| 7,804,982 B2 | 9/2010 | Howard et al. | |
| 8,046,588 B2* | 10/2011 | Gibart et al. | 713/186 |
| 8,595,800 B1* | 11/2013 | Robinson | G06Q 20/04 |
| | | | 726/4 |
| 2003/0006277 A1* | 1/2003 | Maskatiya | G06Q 20/18 |
| | | | 235/379 |
| 2003/0215114 A1* | 11/2003 | Kyle | 382/115 |
| 2005/0065976 A1* | 3/2005 | Holm et al. | 707/104.1 |
| 2005/0152598 A1 | 7/2005 | Birchbauer et al. | |
| 2005/0267752 A1 | 12/2005 | Navratil et al. | |
| 2005/0286745 A1 | 12/2005 | Kamata et al. | |
| 2006/0093190 A1 | 5/2006 | Cheng et al. | |
| 2006/0106605 A1 | 5/2006 | Saunders et al. | |
| 2007/0047770 A1 | 3/2007 | Swope et al. | |
| 2007/0050636 A1 | 3/2007 | Menczel et al. | |
| 2007/0233614 A1* | 10/2007 | McNelley | G06Q 20/401 |
| | | | 705/75 |
| 2007/0294540 A1* | 12/2007 | Wadayama | G06Q 20/341 |
| | | | 713/186 |
| 2008/0052527 A1 | 2/2008 | Siedlarz | |
| 2008/0075334 A1 | 3/2008 | Determan et al. | |
| 2008/0112598 A1* | 5/2008 | Gabara | G10L 17/00 |
| | | | 382/116 |
| 2008/0126809 A1* | 5/2008 | Rothschild | 713/186 |
| 2008/0170758 A1 | 7/2008 | Johnson et al. | |
| 2008/0201579 A1 | 8/2008 | Whillock | |
| 2008/0250245 A1* | 10/2008 | Sanderson | H04L 9/321 |
| | | | 713/169 |
| 2008/0252412 A1 | 10/2008 | Larsson et al. | |
| 2008/0271116 A1 | 10/2008 | Robinson et al. | |
| 2009/0003663 A1* | 1/2009 | Webster | G06K 9/00154 |
| | | | 382/119 |
| 2009/0037978 A1 | 2/2009 | Luque et al. | |
| 2009/0070148 A1* | 3/2009 | Skocic | G06Q 10/10 |
| | | | 705/3 |
| 2009/0106559 A1* | 4/2009 | Chabanne | G06K 9/00087 |
| | | | 713/186 |
| 2009/0171623 A1 | 7/2009 | Kiefer | |
| 2009/0183008 A1* | 7/2009 | Jobmann | H04L 9/0866 |
| | | | 713/186 |
| 2010/0174229 A1* | 7/2010 | Hsu et al. | 604/66 |
| 2011/0007949 A1* | 1/2011 | Hanna | G06K 9/00604 |
| | | | 382/107 |
| 2013/0246388 A1* | 9/2013 | Benini | G07C 9/00158 |
| | | | 707/706 |

FOREIGN PATENT DOCUMENTS

| | | | |
|---|---|---|---|
| WO | WO-02095552 A2 * | 11/2002 | ........... G06F 21/32 |
| WO | WO-2004075097 A1 * | 9/2004 | ........ G07C 9/00087 |
| WO | 2005/109310 | 11/2005 | |
| WO | 2007/055745 | 5/2007 | |
| WO | 2007/128975 | 11/2007 | |
| WO | 2010/030431 | 3/2010 | |

OTHER PUBLICATIONS

Written Opinion, PCT/AU2011/000558; completion date Jun. 21, 2011; 4 pages.
Sandra Mau, et al. "Video Face Matching Using Subset Selection and Clustering of Probabilistic Multi-Region Histograms", Nov. 2010; 8 pages.
Anil K. Jain, et al. "An Introduction to Biometric Recognition", Jan. 2004; 29 pages.
Conrad Sanderson, et al. "Multi-Region Probabilistic Histograms for Robust and Scalable Identity Inference", (2009), pp. 199-208.

* cited by examiner

AUTOMATIC IDENTITY ENROLMENT

TECHNICAL FIELD

This disclosure concerns the automatic enrolment of people into biometric systems. Aspects include methods, computer systems, software and biometric systems.

BACKGROUND ART

Biometric identifiers describe physiological characteristics such as iris, retina, fingerprint, hand, voice, or face. Biometric identifiers can be in the form of essentially raw data as captured by biometric sensors, or processed, such as cropped images, outliers removed or represented in feature form such as a feature histogram.

Biometric computer systems are systems which use one or biometric identifiers to enroll, verify or identify a person. The terms enroll, and register and populate will be used interchangeably throughout this document.

Use of biometrics and multimodal biometrics in biometric systems for access control, verification or identification are increasingly applied to border protection as well as private property access. However, the migration to such biometric systems for a large organisation can be expensive and time consuming due to the large number of people to enroll into the database used by the biometric computer system.

Currently, human operators are needed to manually link a person's biometric signature (comprised of one or more biometric identifiers) to his/her existing employee record. This is however a very costly process. Not only does it cost money to hire people to operate and coordinate the enrolment process, the time lost from employees delayed or taken away from their work to pose for enrolment can also be a significant cost.

An alternative to manual enrolment is to enroll the biometric signature using an existing non-biometric verification instrument, such as an existing swipe, magnetic, or RFID card. In a card-based electronic access control system for example, a card is issued to every user enrolled in the system. The user presents his or her card to a card reader. The reader is usually connected to a controller and a host computer, which can be programmed to identify the user based on the read code. After the user has been identified, information from his/her record can be used to enroll their obtained biometric signature.

Any discussion of documents, acts, materials, devices, articles or the like which has been included in the present specification is not to be taken as an admission that any or all of these matters form part of the prior art base or were common general knowledge in the field relevant to the present invention as it existed before the priority date of each claim of this application.

SUMMARY

In a first aspect there is provided a computer implemented method of automatically associating a second biometric identifier with a records stored in a datastore, wherein each record represents a person and is already associated with at least one biometric identifier of the person, the method comprising:
  (a) receiving or accessing a first biometric identifier and a second biometric identifier, wherein the first and second biometric identifiers represent the same person;
  (b) comparing the first biometric identifier to the biometric identifiers associated with records in the datastore to identify a candidate matching record; and
  (c) causing an association of the second biometric identifier with the candidate record to be stored in memory.

The method takes advantage that many datastores exist that represent sets of people and include biometric identifiers for each person. The method exploits this feature to automatically verify a person's identity and enhance that person's record with further biometric information that can then be used in computer implemented biometric systems. It is an advantage that this datastore can be enhanced without the use of a non-biometric verification instrument, such as an existing swipe, magnetic, or RFID card or personal identification number that would need to be entered to make the association in step (c). Since secondary verification instruments are not required this decreases the chances of fraud from users stealing those verification instruments.

The method may further comprise determining a level of confidence in the candidate matching record, such as a threshold, and only performing step (c) if the level of confidence is satisfactory.

Step (b) may further comprise determining a level of confidence in the candidate matching record, and if a candidate matching record is not identified to a satisfactory level of confidence, repeating steps (a) and (b) until the satisfactory level of confidence is reached.

Alternatively, step (b) further comprises repeating steps (a) and (b) until a maximum number of repeats is reached or the end of predetermined time period is reached.

The method may comprise receiving or accessing a further instance of a first biometric identifier and second biometric identifier representing the same person and comparing each instance of the first biometric identifier to the biometric identifiers associated with records in the datastore to identify a candidate matching record. It is an advantage of the method that the identity of the person can be verified by using multiple instances of the first biometric identifier which will improve the accuracy of the matching process, and in turn accuracy in the association in step (c).

Further instances of the first and second biometric identifier are identified (i.e. as belonging to the same person) by comparison to previously received or accessed first and second biometric identifiers to identify matches.

Comparing each instance of the first biometric identifier may comprise comparing a combined representation of each instance of the first biometric identifier to the biometric identifiers associated with records in the datastore. The combined representation is based on a fusion of the instances of the first biometric identifiers, such as a fusion in feature space.

The combined representation may be based on clustering the instances of the first biometric identifiers and comparing the cluster to the biometric identifiers associated with the records in the datastore. The clustering may also be based on the second biometric identifiers.

After step (a) the method may comprise the step of determining whether at least the second biometric identifier is already associated with a record of the datastore, and if so not performing step (b) and (c).

The first biometric identifier and the second biometric identifier may be of different types.

The method may further comprise a first step of capturing the first biometric identifier and second biometric identifier. Capturing may not require active involvement of the user.

The biometric identifiers may be received from biometric sensors or accessed from local or remote memory which may be separate to the memory referred to in step (c). The method may be performed in real time. Step (c) may comprise storing the association in a second datastore.

The biometric identifiers can include biometric data as captured by biometric sensors, and/or processed biometric data, such as cropped images or feature histograms.

The at least one biometric identifier already associated with each record may be representative of the face of the person. In turn, the first biometric identifier may be based on an image captured of the face of the person.

Alternatively, the first biometric identifier can be any existing biometric identifier already stored in the datastore that can be used for identity verification to associate a new type of biometric identifier to the record.

The biometric identifier may be representative of one or more physiological feature of the person.

Step (c) may further comprise causing an association of the first biometric identifier with the candidate record to be stored in memory. Optionally, each instance of the first and second biometric identifier may be associated with the candidate record. Optionally a third biometric identifier may be received or accessed in step (a) that is also associated with the candidate record in step (c). This has the advantages of improving the depth and therefore future useable accuracy of the biometric information stored.

The second identifier may be a more accurate type of biometric identifier of a person than the first identifier.

The first identifier may be a representation of the iris of the person.

The datastore may be employee records or records of personnel allowed access to a physical area.

Associating the second biometric identifier to the candidate record may be taken to be enrolment of the person into a computer controlled biometric system. The method may be performed during an enrolment period for the computer controlled biometric system.

It is an advantage of at least one embodiment of the method that specific task personnel are not needed to enroll users into the biometric system. Further since the biometric identifiers can be captured from the user without their active involvement, such as simply walking past the sensors without needing to interact with the sensors, the method is simple without the need for training.

In a second aspect there is provided software, that is computer readable medium that when read and executed by a computer causes the computer to operate in accordance with the method described above.

In a third aspect there is provided a computer system to automatically associate a second biometric identifier with a record stored in a datastore, the system comprising:
  a processor;
  a datastore comprised of records, wherein each record represents a person and is already associated with at least one biometric identifier of the person;
  an input port to receive or memory for the processor to access a first biometric identifier and a second biometric identifier, wherein the first and second biometric identifiers represent the same person; and
  the processor to compare the first biometric identifier to the biometric identifiers associated with records in the datastore to identify a candidate matching record, and to cause an association of the second biometric identifier with the candidate record to be stored in memory.

In a fourth aspect there is provided a biometric system using associations stored in memory according to the method described above.

Optional features of the first aspect of the invention are of course optional features of the second, third and fourth aspects of the invention.

BRIEF DESCRIPTION OF DRAWINGS

An example will be described with reference to.

BEST MODE

Figure 1:
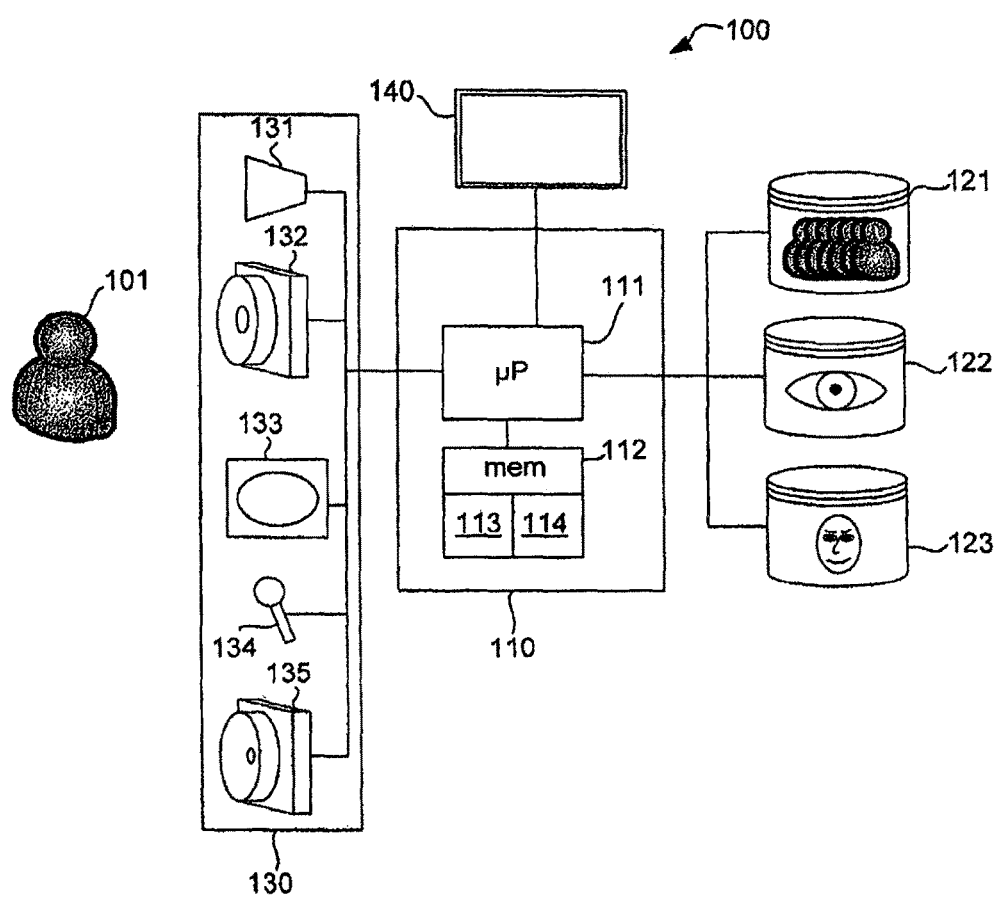
FIG. 1 illustrates a computer system 100 for automatically populating existing database records (of say employees) with biometric information.

FIG. 1 illustrates a computer system 100 for automatically populating existing database records (of say employees) with biometric information from a person 101.

The computer system comprises a controller 110 including a processor 111 and a memory 112. The memory is divided into program code memory 114 and data memory 113. The controller 110 is connected to a reference face image database 121 that associates each face to a face id. In one example the face id is identical the employee id of the employee with that face and in that sense is an existing employee database. The controller 110 is also connected to an iris image database 122 that relates each iris image to an iris id. The iris image database 122 also records whether a particular iris has been enrolled, i.e. linked/associated to one employee id. The controller 110 is also connected to a captured face image database 123. Each database 121, 122 and 123 is stored in memory of the controller 110 that can be either local or remote to the controller.

The controller 110 is further connected by an input port to a biometric input device 130. The biometric input device comprises several biometric sensors such as face image camera 131, iris scanner 132, fingerprint scanner 133, microphone 134 and retina scanner 135. The controller is also connected to an operator interface 140. The operator interface 140 may be a touch sensitive screen, may comprise a separate display and a keyboard or may be any other suitable computing device.

In use, the person 101 is enrolled as the person 101 passes the biometric input device 130. During the enrolment period (the period in which biometric identifiers are saved to the database and associated with a person), the computer system 100 captures multiple biometric identifiers over one or more observations with at least one biometric identifier already existing in a database.

In this example, the biometric input device is installed at the portal of an office building. As the person 101 passes by, at least two biometric identifiers are captured. In one example, these two identifiers are the face and the iris of the person 101. A face image and an iris image are captured by the face image camera 131 and the iris scanner 132 respectively. The capturing is orchestrated by processor 111 executing instructions of a software stored on program code memory 114.

Figure 2:
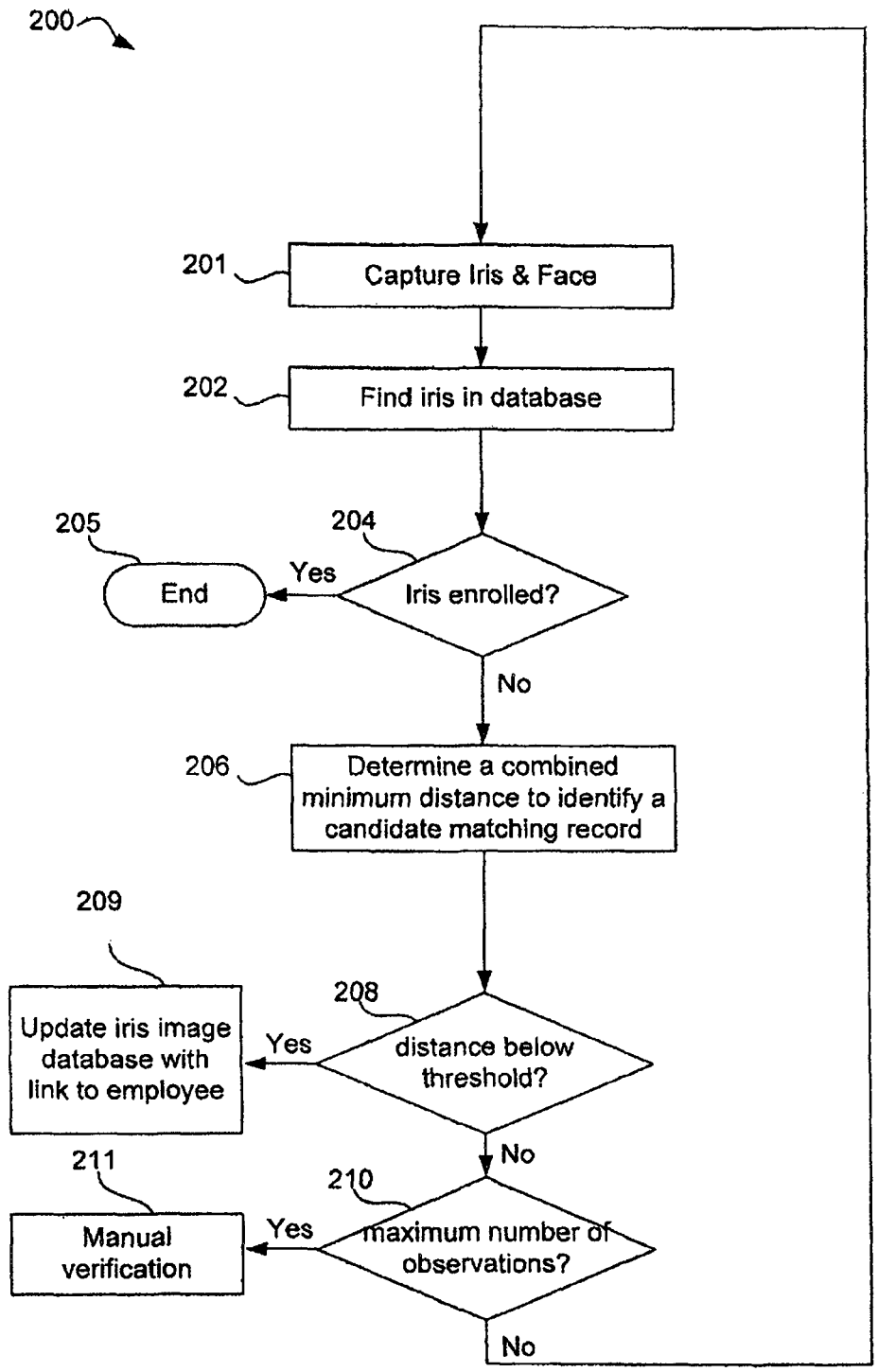
FIG. 2 illustrates a method 200 for automatically populating existing database records (of say employees) with biometric information.

FIG. 2 illustrates a method 200 performed by the processor 111 again executing instructions of a software program stored on program code memory to automatically populate existing database records (of say employees) with biometric information. In this example, it is assumed that a company has a reference face image database with face images from all employees. A second biometric identifier, in this example the iris image, is used and the aim is to associate a biometric identifier of the iris image to the respective employee. The required types of biometric identifiers to be linked depend on the needs of the access control system (for example, multimodal biometric access control systems may link both iris and face to the employee or may capture and store a third or fourth biometric identifier). In other examples, other combinations of biometric identifiers may be used, such as a fingerprint needs to be linked to an existing voice sample of an employee or a retina image may be used instead of the iris image.

The method is most effective if the same person walking past a second time is recognised as the same person as before. Therefore, the second biometric identifier, or a combination of biometric identifiers, needs to provide reliable matching. In this example, the iris image is used as such a biometric identifier for matching instances of biometric identifiers of the same person.

The method 200 commences by capturing 201 an iris image and a face image of a person 101. The captured iris image (or representation of the images) is matched 202 against the irises saved in the iris image database 122 to find the iris id of the iris that best matches the captured iris image.

If the person is passing by for the first time, the captured iris image will not find a match in the iris image database 122. In that case, the iris image is stored in the iris image database 122 with an associated new iris id, and the captured face is also stored in the captured face image database 123 associated with the new iris id. The captured face image is compared to the records of the reference face image database 121 by computing a distance between the captured face and the faces from the reference face image database 121. If a candidate matching record is found that meets a satisfactory level of confidence, such as has a distance below a predefined threshold, then the iris image is associated with this face and the related employee id in the iris image database 122. If no match satisfies the threshold condition the method restarts at step 201.

The following describes the case of a person passing by for an additional time. In that case, the captured iris image matches an iris image in the iris image database 122. From the iris image database 122 it is determined whether the iris image has already been enrolled 204, that is an association between the iris image and an employee has already been stored, such as the employee id has been recorded with this iris image in the iris image database 122. If the iris image has already been enrolled the method 200 ends 205 here. The person may be greeted by name or notified of the successful enrolment.

If the iris has not been enrolled, the newly captured face image is stored in the face image database associated with the iris id (as determined from the look up on the iris image database at step 201). The aim is now to identify a record, that is face, from the reference face image database that best matches the all captured face images of that iris id.

Each face associated with the iris id can be compared separately and the results combined. In this example, the best match is determined by determining a combined minimum distance 206. In one example, the method used for face matching is multi-region probabilistic histogram (MRH) as described in [1]. This method employs 2-dimensional Discreet Cosine Transformation (DCT) and a statistical model to transform the face images into a feature space spanned by feature vectors. Based on these feature vectors, a distance between two face images can be determined.

Figure 3:
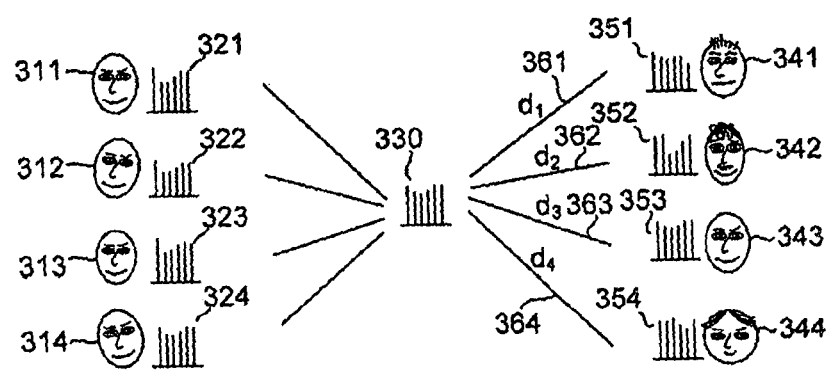
FIG. 3 illustrates determining a combined minimum distance between captured face images and face images from a reference face image database.

FIG. 3 illustrates the determining of a combined minimum distance between captured face images and face images from a reference face image database. Four face images instances 311-314 are of the same person captured under different conditions, such as by four passes of the biometric input device 110. As described above these images are grouped since they were captured together with matching irises. Each of the captured face images 311-314 is transformed into a respective feature vector 321-324 as in the MRH method. Based on the feature vectors 321-324 a combined feature vector 330 is determined.

Figure 4:
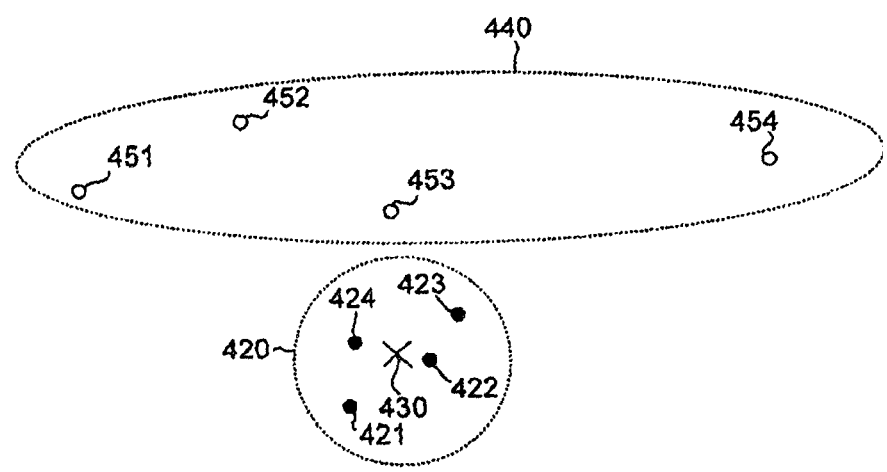
FIG. 4 illustrates determining the combined distance in the feature space.

FIG. 4 illustrates determining the combined distance in the feature space. Reference numerals in FIGS. 3 and 4 correspond where they, have the same last two digits. FIG. 4 shows a first feature space 420 of face image instance of one person. Solid points 421-424 represent the feature vectors 321-324 in FIG. 3. Since the feature vectors 421-424 are from the same person, they are clustered within close distance. An example of a combined feature vector 430 by calculating average MRH is located in the cluster centre of the first feature space 420.

Returning back to FIG. 3, four face images 341-344 from a reference face image database are shown together with the respective feature vectors 351-354. Combined distances 361-364 are shown between the combined feature vector 330 and the feature vectors of the faces from the reference face image database 121. A detailed explanation of how these distances are computed can also be found in [1].

FIG. 4 shows a second feature space 440 including four circles 451-454 representing the feature vectors 351-354 of faces from the reference face image database in FIG. 3. It is now apparent from FIG. 4 that the feature vector 453 of face 343 is closest to the combined feature vector 430 of the captured face images. The distance of the combined feature vector 430 to the feature vector 453 is then referred to as combined minimum distance. As a result, the record for face image 343 from the reference library is determined as the best candidate match to the captured face images 311-314. A threshold or classifier can be further used to determine whether this combined minimum distance is confident enough to associate the captured faces with the identity of the best match.

It is noted that the first feature space 420 and the second feature space in FIG. 4 are shown as disjunctive but may also be intersecting. In fact, the best match, in this example feature vector 453, may be located at or close to the location of the combined feature vector 430.

A different way of determining a combined minimum distance is to determine a distance between each of the feature vectors 321-322 of the captured face images 311-314 and each of the feature vectors 351-354 of the face images 341-344 from the reference face image database. From these 16 distances the smallest distance is selected. In the example of FIG. 4 this smallest distance is between feature vectors 423 and 453. Alternatively, an average is computed of the distances between the feature vectors 321-324 and one face image 341 from the reference face image database. This step is repeated for the remaining face images 342-343 from the reference face image database. From the resulting average distances the smallest average distance is selected. Referring to FIG. 4 this means that the average of distances between feature vectors 421-424 and feature vector 453 is smaller than the average distance between feature vectors 421-424 and any of the remaining feature vectors 451, 452 and 454.

It should be noted that a combination of two methods, method of feature averaging of captured faces and method of minimizing over multiple face searches, can also be used to find the closest matching identity. For example, rather than having one cluster center 430 through averaging the features, multiple cluster centers can be derived for the captured faces through feature clustering techniques such as k-means. Then with each of those cluster centers, the distances to the faces in the image database can be determined and minimum distance (and corresponding) found.

Since the method of minimum distances may be influenced by outliers and therefore less robust, the first method of determining a combined feature vector 330 is applied in the following.

The combined minimum distance is compared 208 to a threshold value. If the combined minimum distance is below the threshold the iris image database is updated 209 by associating the employee id with the iris id, in the example of FIG. 3 the employee id related to face image 343.

This completes the enrolment for this particular person. If the combined minimum distance is above the threshold more observations (i.e. instances) are required. Before the next observation is captured, it is determined 210 whether a predetermined maximum number of observations has already been processed. If the maximum number of observations has been reached, the iris image is verified 211 manually by the operator. If the maximum number of iterations has not been reached, the method waits for the person to pass by 201 again and another face and iris image can be captured 202. Typically, the method would be concluded at the end of the enrolment period.

It will be appreciated by persons skilled in the art that numerous variations and/or modifications may be made to the invention as shown in the specific embodiments without departing from the scope of the invention as broadly described.

For example, three databases are described as used to perform the invention where in fact only as few as one database is required. For example associations between an employee and the iris image could be made directly into the reference image database where the iris image is also stored. Iris images of unidentified personnel could be stored in temporary records until associated with an employee id.

Identifying instances biometric identifiers of the same person over time is described here is based on comparing iris images alone. Better accuracy is achieved is the comparison is made on all available biometric identifiers. In this case, both the iris and face image is compared to the already captured images in the iris and face image captured database in, order to identify previously captured images.

At step 202 the most recently captured iris image can also be stored in the iris database associated with the identified iris id. All the iris images associated with iris id may be then be used the next time step 202 is performed to again improve accuracy.

The computer system of FIG. 1 could be a distributed computer system.

The image of the person's face can also be associated with the employee id in the iris datastore. The example only receives two types of biometric identifiers. In alternate examples, three or more biometric identifiers could be received and then also associated with the employee id in the iris datastore. More biometric information stored, the more accurate the enrolment database is, including the number of instances of biometric identifiers it is based on and the number of types of biometric identifiers.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publicly accessible network such as the interne.

It should also be understood that unless specifically stated otherwise as apparent from the following discussion, it is appreciated that throughout the description, discussions utilizing terms such as "estimating" or "processing" or "computing" or "calculating", "optimizing" or "determining" or "displaying" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

[1] Sanderson, Conrad and Lovell, Brian C. (2009). *Multi-region probabilistic histograms for robust and scalable identity inference*. In; Massimo Tistarelli and Mark S. Nixon, Advances in Biometrics: Proceedings of Third International Conference, ICB 2009. 3rd IAPR/IEEE International Conference on Biometrics, Alghero, Italy, (199-208). 2-5 Jun. 2009.

The invention claimed is:

1. A computer implemented method of automatically enrolling a second biometric identifier by associating the second biometric identifier with records stored in a datastore, wherein each record represents a person and is already associated with at least one biometric identifier of the person, the method comprising:
   (a) receiving or accessing a first biometric identifier and a second biometric identifier, wherein the first and second biometric identifiers represent the same person;
   (b) comparing the first biometric identifier to the biometric identifiers already associated with records in the datastore to identify a candidate matching record;
   (c) determining whether the candidate matching record is identified to a predefined confidence level; and
   (d) when the candidate matching record is identified to the predetermined confidence level, automatically enrolling the second biometric identifier by storing in memory an association of the second biometric identifier with the candidate matching record, whereby the first and second biometric identifiers are associated with the candidate record, and whereby the candidate record is enhanced by associating the second biometric identifier with the candidate record.

2. The computer implemented method according to claim 1, wherein if a candidate matching record is not identified to a satisfactory level of confidence, repeating steps (a); (b) and (c) until the satisfactory level of confidence is reached.

3. The computer implemented method according to claim 1, wherein the method comprises receiving or accessing a further instance of a first biometric identifier and second biometric identifier representing the same person and comparing each instance of the first biometric identifier to the biometric identifiers associated with records in the datastore to identify a candidate matching record.

4. The computer implemented method of claim 3, wherein comparing each instance of the first biometric identifier comprises comparing a combined representation of each instance of the first biometric identifier to the biometric identifiers associated with records in the datastore.

5. The computer complemented method of claim 4, wherein the combined representation is based on clustering the instances of the first biometric identifiers and comparing the cluster to the biometric identifiers associated with the records in the datastore.

6. The computer implemented method of claim 1, wherein the first biometric identifier and the second biometric identifier are of different types.

7. The computer implemented method of claim 1, wherein the at least one biometric identifier already associated with each record is representative of the face of the person.

8. The computer implemented method of claim 1, wherein the second identifier is a more accurate type of biometric identifier of a person than the first identifier.

9. The computer implemented method of claim 1, wherein the first identifier is a representation of the iris of the person.

10. The computer implemented method of claim 1, wherein the datastore is employee records or records of personnel allowed to access to a physical area.

11. The computer implemented method of claim 1, wherein associating the second biometric identifier to the candidate record is taken to be enrolment of the person into a computer controlled biometric system.

12. A tangible computer readable medium storing computer instructions that, when read and executed by a computer, causes the computer to operate in accordance with the method of claim 1.

13. A computer system to automatically enroll a second biometric identifier by associating the second biometric identifier with a record stored in a datastore, the system comprising:
   a processor;
   a datastore comprised of records, wherein each record represents a person and is already associated with at least one biometric identifier of the person;
   an input port to receive or memory for the processor to access a first biometric identifier and a second biometric identifier, wherein the first and second biometric identifiers represent the same person; and
   the processor for comparing the first biometric identifier to the biometric identifiers already associated with records in the datastore to identify a candidate matching record, and to determine whether the candidate matching record is identified to a predefined confidence level, and when the candidate matching record is identified to the predefined confidence level, automatically enrolling the second biometric identifier by storing in memory an association of the second biometric identifier with the candidate matching record, whereby the first and second biometric identifiers are associated with the candidate record and, whereby the candidate record is enhanced by associating the second biometric identified with the candidate record.

14. A biometric system using associations stored in memory according to the method of claim 1.

15. The computer implemented method according to claim 1, wherein the first and second biometric identifiers are captured from a person by biometric sensors.

16. The computer implemented method according to claim 1, wherein the step of receiving or accessing a first biometric identifier and a second biometric identifier is carried out without the need for the active involvement of the person.

* * * * *